United States Patent
Lin

(10) Patent No.: US 8,195,930 B2
(45) Date of Patent: Jun. 5, 2012

(54) COMPUTER SYSTEM WITH REDUCED STORAGE DEVICE AND ASSOCIATED BOOTING METHOD

(75) Inventor: Hao-Lin Lin, Taipei (TW)

(73) Assignee: Via Technologies, Inc., Taipei (TW)

( * ) Notice: Subject to any disclaimer, the term of this patent is extended or adjusted under 35 U.S.C. 154(b) by 395 days.

(21) Appl. No.: 12/624,846

(22) Filed: Nov. 24, 2009

(65) Prior Publication Data

US 2010/0131748 A1 May 27, 2010

(30) Foreign Application Priority Data

Nov. 26, 2008 (TW) .............................. 97145780 A

(51) Int. Cl.
G06F 9/00 (2006.01)
G06F 13/28 (2006.01)
G06F 13/42 (2006.01)
G06F 12/00 (2006.01)

(52) U.S. Cl. ................. 713/2; 713/1; 710/22; 710/104; 710/105; 710/305; 711/101; 711/147

(58) Field of Classification Search .................. 713/1, 2; 710/22, 104, 105, 305; 711/101, 147
See application file for complete search history.

(56) References Cited

U.S. PATENT DOCUMENTS

| | | | |
|---|---|---|---|
| 7,213,173 B2 * | 5/2007 | Chen et al ........................ | 714/36 |
| 7,234,049 B2 * | 6/2007 | Choi et al. ........................ | 713/1 |
| 7,793,036 B2 * | 9/2010 | Goh et al. ....................... | 711/103 |
| 7,849,302 B2 * | 12/2010 | Wu ................................... | 713/2 |

OTHER PUBLICATIONS

Zhang, Qi-gui et al., "Design of Bootloader Based-on Different Flash-ROM", Computer Engineering and Applications, 2007, 43 (33), p. 112-114, College of Information Engineering, Taiyuan University of Technology, Taiyuan 030024, China.

* cited by examiner

Primary Examiner — Stefan Stoynov
(74) Attorney, Agent, or Firm — Kirton McConkie; Evan R. Witt

(57) ABSTRACT

A computer system with integrated storage device for storing both a basic input/output system (BIOS) code and an operating system (OS) code and an associated booting method are provided. The computer system includes a central processing unit, a storage device controller and the storage device. The BIOS code and the OS code are stored in an invisible are and a visible area of the storage device, respectively. At first, the storage device controller is activated to read data from an architecture information area of the storage device to perform initialization. Then, the initialized storage device controller converts a read-only memory access command issued from the central processing unit into a suitable format to control loading of the BIOS code from the invisible area. At last, the storage device controller controls loading of the OS code from the visible area to finish the booting of the computer system.

18 Claims, 6 Drawing Sheets

COMPUTER SYSTEM WITH REDUCED STORAGE DEVICE AND ASSOCIATED BOOTING METHOD

FIELD OF THE INVENTION

The present invention relates to a computer system and a booting method applied to the computer system, and more particularly to a computer system having a storage device storing therein both a basic input/output system code and an operating system code and an associated booting method.

BACKGROUND OF THE INVENTION

Please refer to FIG. 1, a functional block diagram illustrating a conventional computer system. The computer system includes a central processing unit (CPU) 10, a north bridge chip 11, a south bridge chip 12, first storage device 13 and second storage device 14. To boot the computer system, it is necessary to load both basic input/output system (BIOS) codes and operating system (OS) codes into a core circuit of the computer system. The BIOS codes and the OS codes are usually stored in different types of storage devices. For example, the BIOS codes 130 are usually stored in a read-only memory (the first storage device 13) while the OS codes 140 are usually stored in a hard disk drive (the second storage device 14). Hence, the first transmission interface 131 for data transmission between the south bridge chip 12 and the first storage device 13 is quite different from the second transmission interface 141 for data transmission between the south bridge chip 12 and the second storage device 14. For example, the first transmission interface 131 may be implemented with an industry standard architecture (ISA) interface, a low pin count (LPC) interface or a serial peripheral interface (SPI) while the second transmission interface 141 may be implemented with an integrated drive electronics (IDE) interface or a serial advanced technology attachment (SATA) interface.

Since two kinds of storage devices and two kinds of transmission interfaces are required, the wasteful duplication of the devices with similar functions is arranged in the computer system. Such arrangement causes higher cost and wastes more power. It adversely affects the energy efficiency and competitiveness. Hence, a computer system with an integrated storage device is desired to enhance the overall performance.

SUMMARY OF THE INVENTION

The present invention provides a computer system with an integrated storage device for storing both BIOS codes and OS codes.

The present invention also provides a booting method applied to the computer system with integrated storage device for storing both BIOS codes and OS codes.

According to an aspect of the present invention, the computer system includes a central processing unit, a storage device and a storage device controller. The storage device may be implemented with a NAND flash memory. The central processing unit issues a first access command and a second access command to load the BIOS codes and the OS codes. The BIOS codes and the OS codes are stored in an invisible area and a visible area of the storage device, respectively. The storage device controller controls loading of the BIOS code in response to the first access command and controls loading of the OS code in response to the second access command in sequence to complete the booting procedure of the computer system. In particular, the first access command is transmitted to and converted by the storage device controller according to a predetermined voltage of a controlling pin to allow the storage device controller to control the loading of the BIOS code from the storage device, but not conventional BIOS read-only memory.

According to another aspect of the present invention, the booting method of the computer system is performed by a first step of activating the storage device controller to read data from an architecture information area of the storage device in response to a predetermined voltage of a strapping pin to perform an initialization of the storage device controller. A read-only memory access command corresponding to loading of the BIOS codes is issued from the central processing unit and directed to the initialized storage device controller. The storage device controller converts the read-only memory access command into a suitable format to control the loading of the BIOS codes from an invisible area of the storage device. After the loading of the BIOS codes is complete, the storage device controller controls loading of the OS codes from a visible area of the storage device.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
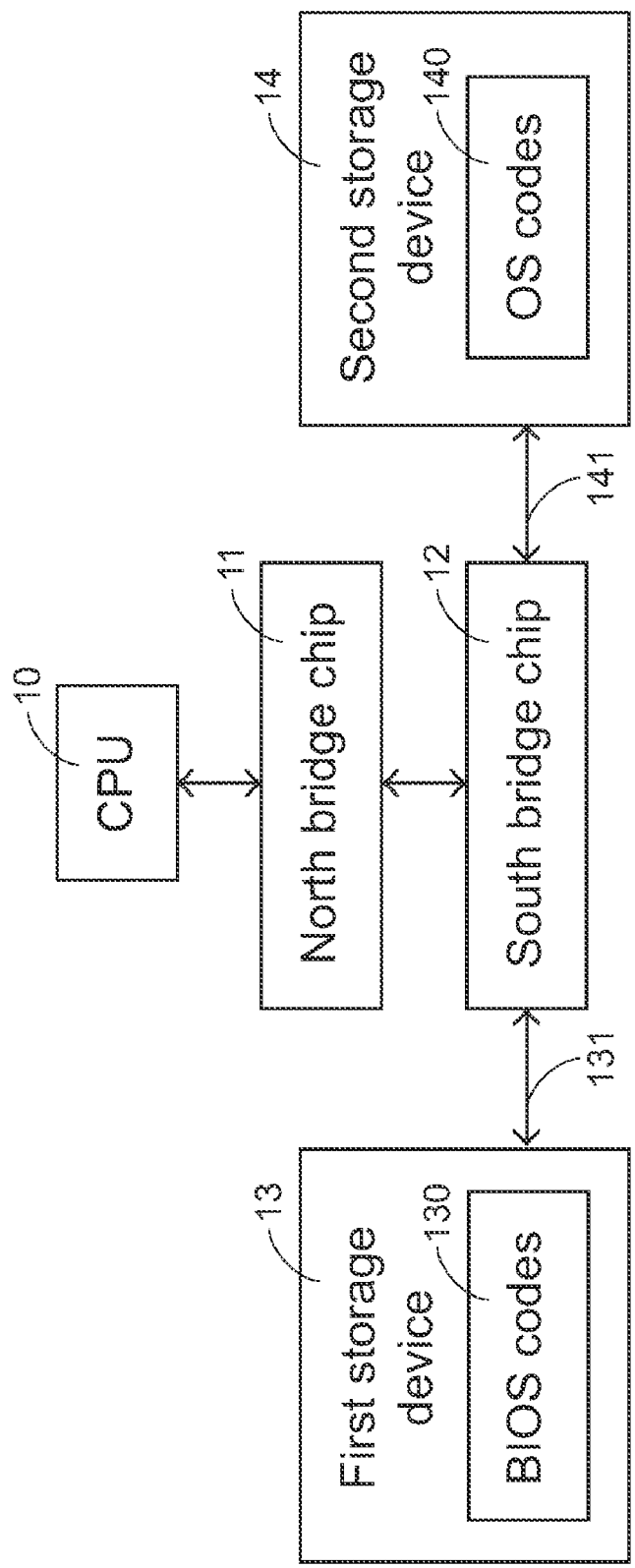
FIG. 1 is a functional block diagram illustrating a conventional computer system wherein the BIOS codes and the OS codes are stored in respective storage device.
Figure 2:
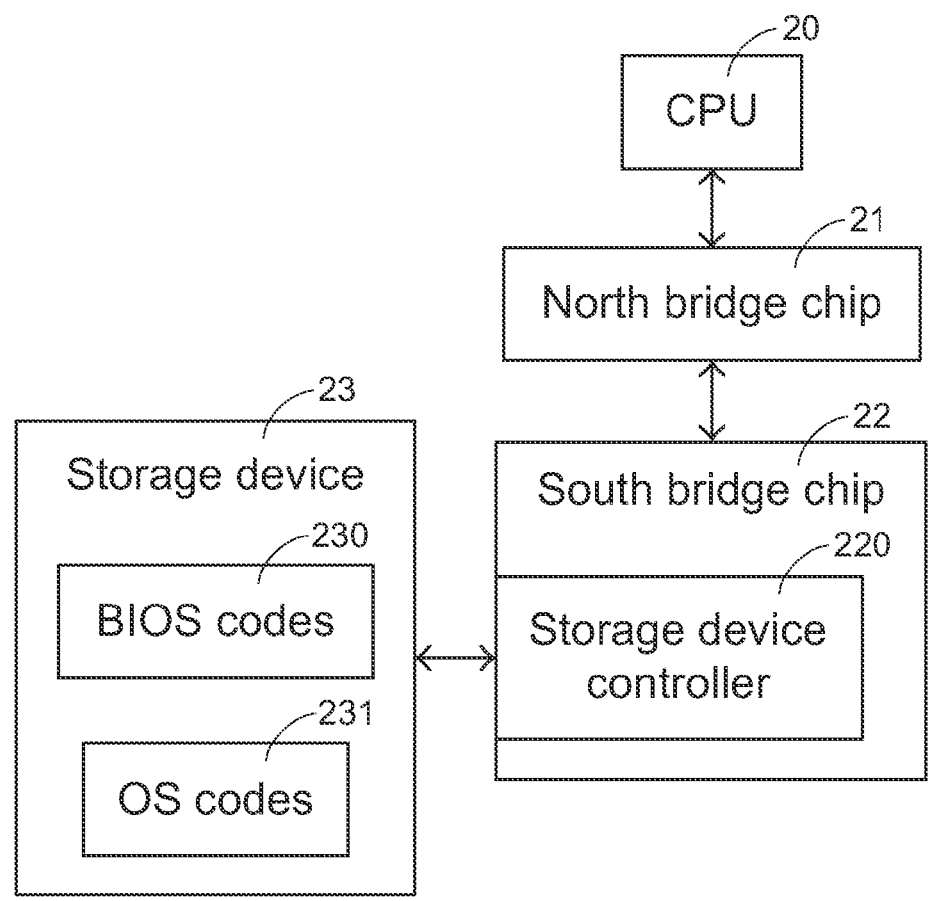
FIG. 2 is a functional block diagram illustrating a preferred embodiment of a computer system with integrated storage device for storing both the BIOS codes and the OS codes according to the present invention.

Please refer to FIG. 2, a functional block diagram illustrating a new computer system with integrated storage device according to the present invention. The computer system includes a central processing unit (CPU) 20, a north bridge chip 21, a south bridge chip 22 and a single storage device 23. The south bridge chip 22 includes a storage device controller 220. The CPU 20 may be, but not limited to, a complex instruction set computing (CISC) CPU or a reduced instruction set computing (RISC) CPU. The storage device 23 for example is implemented with a NAND flash memory. In this embodiment, both the basic input/output system (BIOS)

codes 230 and operating system (OS) codes 231 are stored in the same storage device 23. In other words, the two storage devices 13 and 14 of the prior art are integrated into the single storage device 23. Hence, the first storage device 13 for storing the BIOS codes may be omitted to reduce the power consumption.

Figure 3:
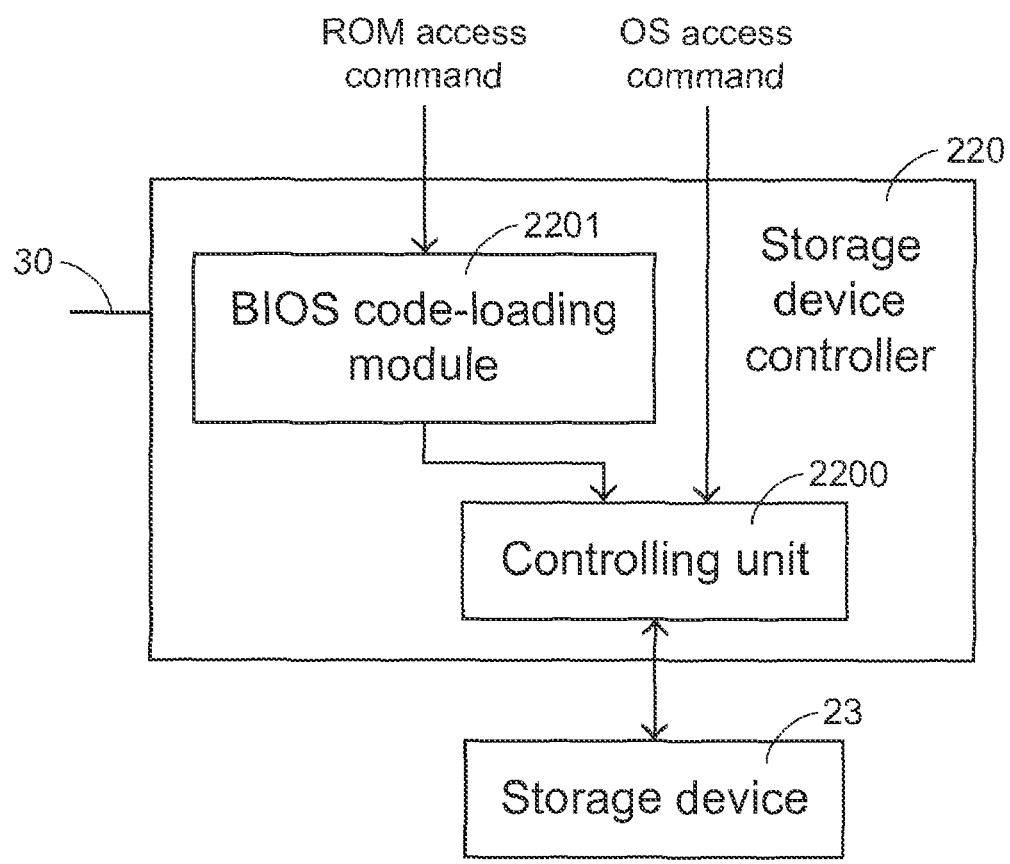
FIG. 3 is a functional block diagram illustrating a preferred embodiment of the storage device controller of FIG. 2.

Please refer to FIG. 3, a functional block diagram illustrating a preferred embodiment of the storage device controller 220 of FIG. 2. The storage device controller 220 includes a BIOS code-loading module 2201, a controlling unit 2200 and a strapping pin 30. During the booting procedure, the CPU 20 automatically loads the BIOS codes 230 to inform the computer system the basic settings of respective hardware at the initial step. Hence, a loading path has to be preset to allow the computer system to realize where to access the BIOS codes. In this embodiment, a predetermined voltage level of the strapping pin 30 indicates that the loading of the BIOS codes is controlled by the storage device controller 220. In other words, the computer system realizes that the storage device controller 220 is the component which manages the loading of the BIOS codes according to the voltage level of the strapping pin 30 immediately after the computer system is powered on. The BIOS code-loading module 2201 is enabled by the computer system to receive a first access command, i.e. a read-only memory (ROM) access command from the CPU 20. The ROM access command is converted into a suitable format by the BIOS code-loading module 2201 so that the controlling unit 2200 can access data from the storage device 23 in response to the converted ROM access command. After the loading of the BIOS codes 230 stored in the storage device 23, the controlling unit 2200 further receives a second access command, i.e. an OS access command to load the OS codes 231 stored in the storage device 23 or some other data, like application program data and other user application data.

Figure 4:
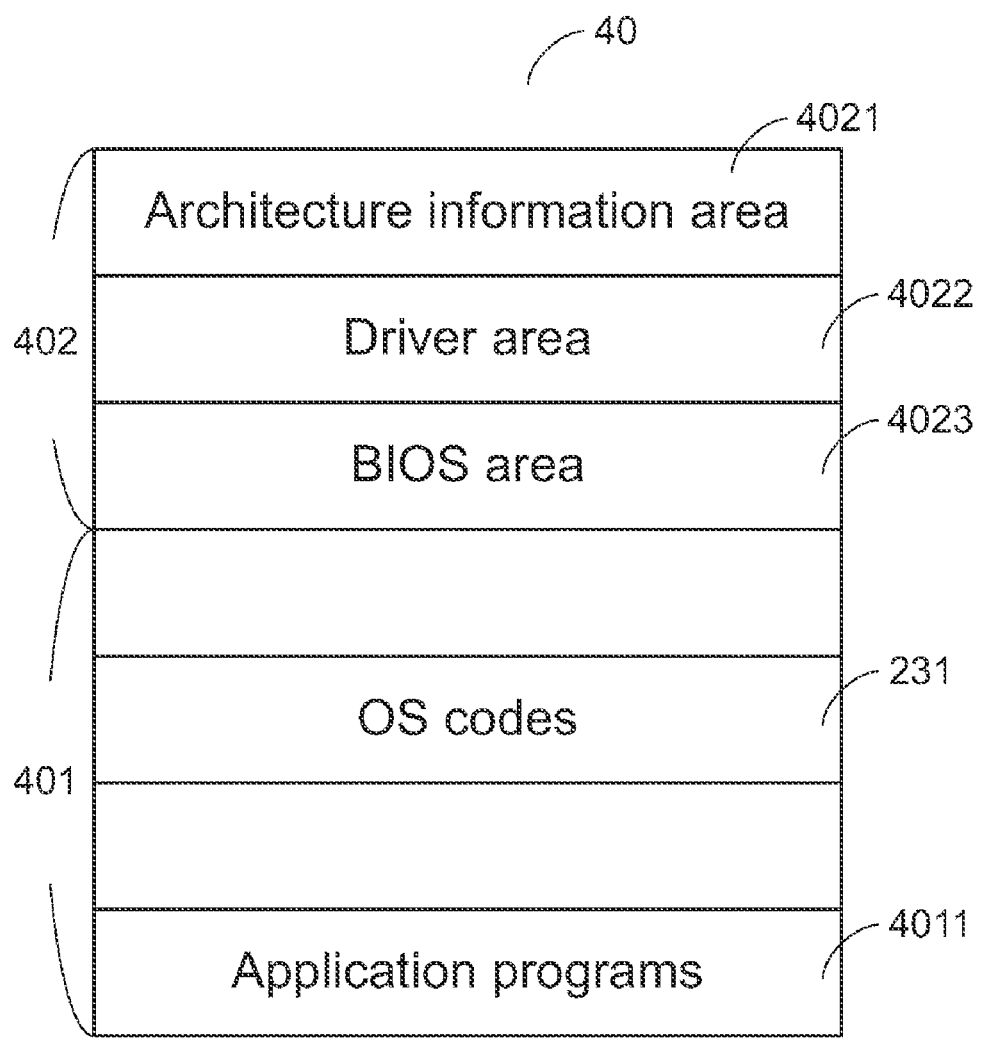
FIG. 4 is a schematic diagram showing data arrangement in the storage device of FIG. 2.

Therefore, the storage of the BIOS codes and OS codes should be arranged in a specific way so that the controlling unit 2200 can access them with no possibility of confusion or mistakes. Please refer to FIG. 4, a schematic diagram showing applicable data arrangement in the storage device 23. The space 40 of the storage device 23 is divided into two portions by a format utility program; one is visible area 401 and the other is invisible area 402. The visible area 401 can be overwritten through an OS program and thus can function as a conventional hard disk drive. In the visible area 401, the stored data includes OS codes 231, application programs 4011 and other user application data (not shown).

On the contrary, the invisible area 402 does not accept overwriting action. The invisible area 402 includes an architecture information area 4021, a driver area 4022 and a BIOS area 4023. Basic information associated with the storage device 23 is placed in the first area, i.e. the architecture information area 4021. The basic information, for example, includes size of the basic read/write unit of the NAND flash memory (the storage device 23), number of data transmission channels and the like. Only after reading the basic information in the architecture information area 4021 to realize correctly initialization, the storage device controller 220 can implement the ROM access command and the OS access command to access data stored in the storage device 23. Furthermore, the architecture information area 4021 comprises the start address of the BIOS codes 230. The second area, i.e. the driver area 4022, provides management information of the visible area 401. After the loading of the OS codes, the operating system needs the drivers stored in the driver area 4022 to access the data in the visible area 401. The BIOS codes 230 are stored in the last area, i.e. the BIOS area 4023 without doubt. A BIOS programming utility program may be used to record the BIOS codes 230 in the BIOS area 4023. Before the loading of the OS codes 231, the visible area 401 is managed and controlled by an option ROM utility program included in the BIOS codes 230 to control the access of the visible area 401 and find the start address of the OS codes 231. It is to be noted that during the initialization, the storage device controller 220 actively reads data from a default address or a predetermined address of the architecture information area 4021 in order to initializes itself. Then, the storage device controller 220 can start the loading of the BIOS codes 230 from the storage device 23.

Figure 5:
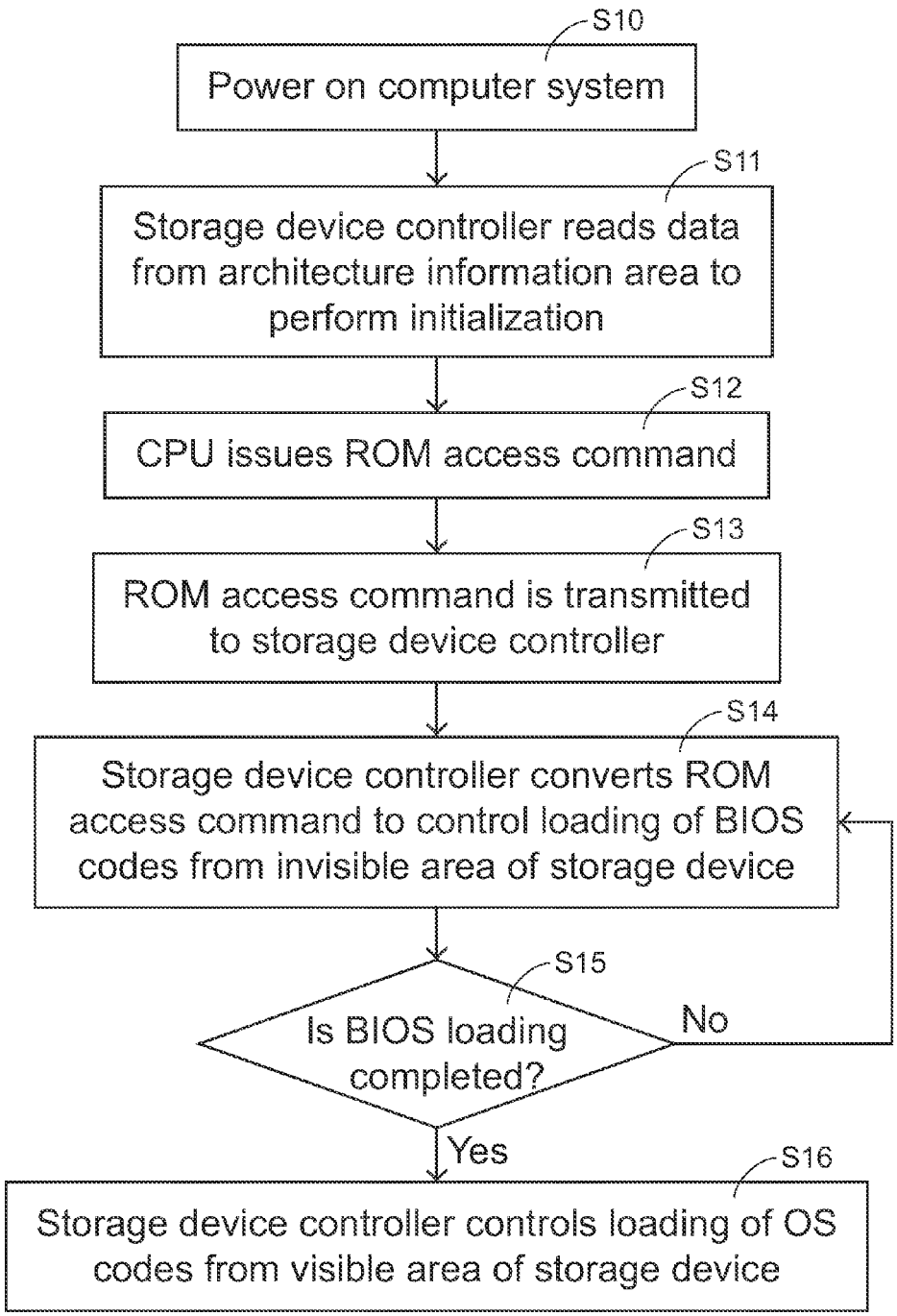
FIG. 5 is flowchart illustrating a booting method of the computer system according to the present invention.

The booting method used for such computer system is described with reference to FIG. 5. When the computer system is just powered on (S10), the voltage level of the strapping pin 30 indicates that the loading of the BIOS codes is controlled by the storage device controller 220. Hence, the storage device controller 220 actively reads the data from a default address or a predetermined address of the architecture information area 4021 of the storage device 23 to perform an initialization (S11). In the meanwhile, a start address of the BIOS codes 230 and other basic information of the storage device 23 are also fetched. After the initialization of the storage device controller 220, the CPU 20 issues a ROM access command (S12). The ROM access command is directed to the storage device controller 220 (S13). Since the ROM access command is issued for accessing a read-only memory, the ROM access command should be converted or decoded into a command suitable for accessing the storage device 23. The conversion may be made by the BIOS code-loading module 2201 of the storage device controller 220. After the conversion, the start address of the BIOS codes 230 stored in the invisible area 402 of the storage device 23 and the transmission protocols of the storage device 23 are obtained so that the controlling unit 2200 of the storage device controller 220 can access the BIOS codes 230 to start the BIOS loading (S14).

In a preferred embodiment, the storage device 23 is implemented with a NAND flash memory, which represents large capacity and low cost. It is to be noted that the size of the BIOS codes 230 is usually greater than the size of the basic unit block of the NAND flash memory. Hence, the BIOS codes 230 are divided into a plurality of blocks to be stored. The aforementioned start address may indicate an address of a first block among the plurality of blocks. The address of the next block is stored in the previous block. For instance, the address of the second block is stored in the first block and the address of the third block is stored in the second block and the like. Accordingly, when one block of the BIOS codes 230 is completely loaded, the next address pointed to the next block is obtained. The BIOS blocks are successively loaded to complete the BIOS loading. Alternatively, the addresses of the blocks may be recorded in a specific block. After reading the specific block, the addresses of the BIOS blocks are obtained. Thus, the BIOS blocks can be successively loaded according to the obtained addresses.

At step S15, it is determined whether the BIOS loading is finished. If the BIOS loading is completed, the storage device controller 220 receives OS access commands to start loading OS codes 231 from the visible area of the storage device 23 (S16). The OS loading is a known technique and the unnecessary details are not given herein.

From the above description, it is realized that the storage device controller 220 can receive the ROM access command and the OS access command or other memory access commands to control the access of the single storage device 23. Therefore, the BIOS codes 230 and the OS codes 231 can be stored in the same storage device to save the dedicated BIOS read-only memory and the associated transmission interface. Such improvement can save the space to reduce the size of the computer system. Moreover, fewer components consume less power so that the computer system is more power-saving and competitive.

Figure 6:
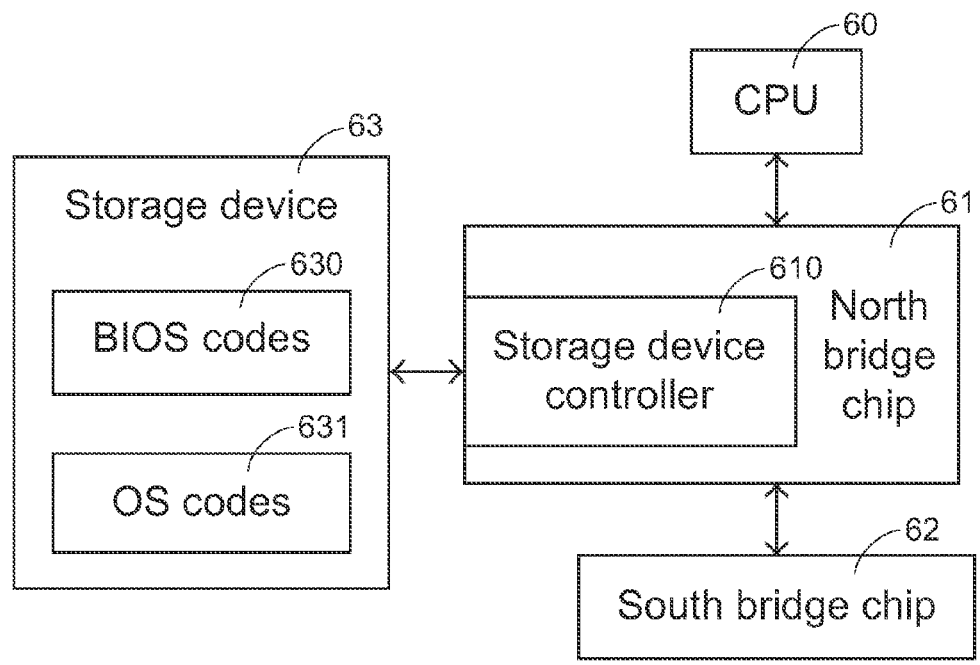
FIG. 6 is a functional block diagram illustrating another preferred embodiment of a computer system according to the present invention.

Alternatively, the storage device controller may be disposed in a component other than the south bridge chip. Please refer to FIG. 6 illustrating another preferred embodiment of the computer system. The computer system includes a CPU 60, a north bridge chip 61, a south bridge chip 62 and an integrated storage device 63 storing therein both BIOS codes 630 and OS codes 631. Different from the embodiment with reference to FIG. 2, a storage device controller 610 for controlling the access of the BIOS codes 630 and the OS codes 631 from the storage device 63 is disposed in the north bridge chip 61. The functions and features of each component are similar to those described in the above-described embodiment with reference to FIG. 2.

Figure 7:
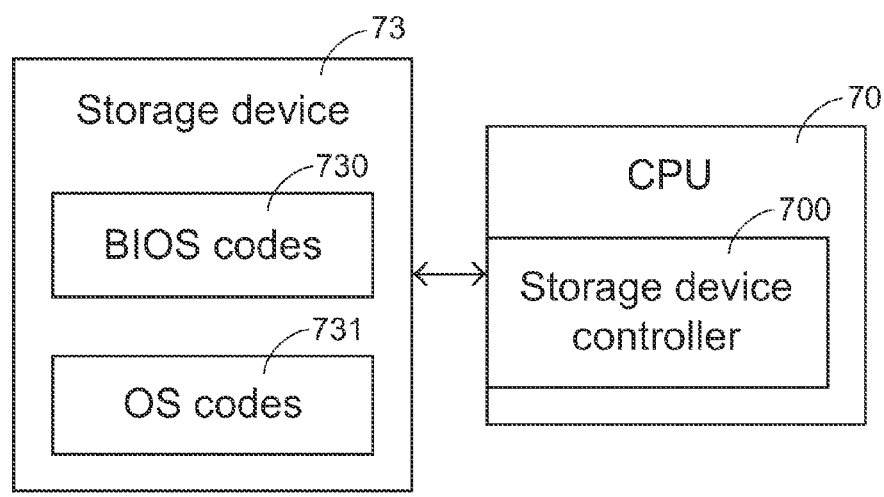
FIG. 7 is a functional block diagram illustrating a further preferred embodiment of a computer system according to the present invention.

A further preferred embodiment of the computer system is provided in FIG. 7. The computer system includes a CPU 70 and an integrated storage device 73 storing therein both BIOS codes 730 and OS codes 731. Different from the embodiment with reference to FIG. 2, a storage device controller 710 for controlling the access of the BIOS codes 630 and the OS codes 631 from the storage device 63 is integrated into the CPU 70, especially when the CPU 70 is implemented with a RISC CPU. Such arrangement enhances the overall performance and efficiency of the computer system.

To sum up, according to the present invention, it simplifies different types of storage devices into a single storage device to reduce redundant components. Hence, the BIOS codes and the OS codes are not separately stored in different storage devices. The present invention is accomplished by providing a storage device controller to receive different types of conventional commands, for example, for hard disk drive and for read-only memory to allow access of the single storage device in response to the different commands. Thus, relatively low cost and power consumption can be achieved because of the elimination of the BIOS read-only memory and the associated bus interface.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer system, comprising:
a central processing unit for issuing a first access command and a second access command during a booting procedure of the computer system;
a storage device storing therein a basic input/output system (BIOS) code and an operating system (OS) code; and
a storage device controller in communication with the central processing unit and the storage device, for controlling loading of the BIOS code in response to the first access command and controlling loading of the OS code in response to the second access command after the loading of the BIOS code to complete the booting procedure,
wherein the first access command is transmitted to the storage device controller according to a predetermined voltage of a controlling pin to allow the storage device controller to control the loading of the BIOS code.

2. The computer system according to claim 1 wherein the first access command is a read-only memory access command and the second access command is an operating system access command.

3. The computer system according to claim 1 wherein the storage device is implemented with a NAND flash memory.

4. The computer system according to claim 1 wherein the storage device comprises:
a visible area for storing the OS code; and
an invisible area comprising:
an architecture information area storing therein basic information of the storage device;
a driver area storing management information of the visible area; and
a BIOS area storing the BIOS code.

5. The computer system according to claim 4 wherein the storage device controller reads the basic information to realize initialization.

6. The computer system according to claim 4 wherein the architecture information area further comprises a start address of the BIOS code in the invisible area.

7. The computer system according to claim 6 wherein the BIOS code is divided to be stored in a plurality of blocks of the storage device and the start address points to a first one of the plurality of blocks.

8. The computer system according to claim 1 wherein the storage device controller comprises:
a BIOS code-loading module for receiving and converting the first access command from the central processing unit; and
a controlling unit in communication with the BIOS code-loading module for receiving the converted first access command to access the BIOS code from the storage device and receiving the second access command to access the OS code from the storage device.

9. The computer system according to claim 8 wherein the controlling pin is a strapping pin and the BIOS code-loading module is enabled to convert the first access command according to the predetermined voltage of the strapping pin.

10. The computer system according to claim 1 wherein the storage device controller is disposed in a south bridge chip of the computer system.

11. The computer system according to claim 1 wherein the storage device controller is disposed in a north bridge chip of the computer system.

12. The computer system according to claim 1 wherein the storage device controller is disposed in the central processing unit of the computer system.

13. A booting method of a computer system comprising a central processing unit, a storage device controller and a storage device storing therein a basic input/output system (BIOS) code and an operating system (OS) code, the booting method comprising steps of:
activating the storage device controller to read data from an architecture information area of the storage device to initialize the storage device controller in response to a predetermined voltage of a controlling pin;
directing a read-only memory access command issued from the central processing unit to the initialized storage device controller;
the initialized storage device controller converting the read-only memory access command to control loading of the BIOS code from an invisible area of the storage device; and
the initialized storage device controller controlling loading of the OS code from a visible area of the storage device after the loading of the BIOS code.

14. The booting method according to claim 13 wherein the storage device is implemented with a NAND flash memory.

15. The booting method according to claim 13 wherein the controlling pin is a strapping pin.

16. The booting method according to claim 13 wherein the data read from the architecture information area comprises a start address of the BIOS code in the storage device and basic information of the storage device.

17. The booting method according to claim 16 wherein the basic information is read by the storage device controller to realize initialization.

18. The booting method according to claim 16 wherein the BIOS code is divided to be stored in a plurality of blocks of the storage device and the start address points to a first one of the plurality of blocks.

* * * * *